US012719200B2

(12) United States Patent
Lesniak et al.

(10) Patent No.: US 12,719,200 B2
(45) Date of Patent: Aug. 25, 2026

(54) ELECTRICAL SAFETY CONNECTOR

(71) Applicant: Aptiv Technologies AG, Schaffhausen (CH)

(72) Inventors: Pawel Lesniak, Cracow (PL); Mateusz Daniec, Rzezawa (PL)

(73) Assignee: Aptiv Technologies AG, Schaffhausen (CH)

( * ) Notice: Subject to any disclaimer, the term of this patent is extended or adjusted under 35 U.S.C. 154(b) by 450 days.

(21) Appl. No.: 18/201,842

(22) Filed: May 25, 2023

(65) Prior Publication Data

US 2023/0387622 A1 Nov. 30, 2023

(30) Foreign Application Priority Data

May 27, 2022 (EP) ..................................... 22175707

(51) Int. Cl.
*H01R 13/44* (2006.01)
*H01R 13/42* (2006.01)
*H01R 13/627* (2006.01)

(52) U.S. Cl.
CPC ............. *H01R 13/44* (2013.01); *H01R 13/42* (2013.01); *H01R 13/6271* (2013.01)

(58) Field of Classification Search
CPC .... H01R 13/44; H01R 13/42; H01R 13/6271; H01R 4/30
See application file for complete search history.

(56) References Cited

U.S. PATENT DOCUMENTS 10,381,752 B2 * 8/2019 Kaehny .................... H01R 11/11
11,749,944 B2 * 9/2023 Blakborn .......... B29C 45/14639 439/750
2013/0090000 A1 * 4/2013 Zhao .................... H01R 11/282 439/370
2018/0294600 A1 * 10/2018 Loncar .................. H01M 50/55
2021/0320454 A1 * 10/2021 Blakborn ............. H01R 13/405
2023/0261424 A1 * 8/2023 Nishijima .......... H01R 13/6592 439/607.41
2024/0339770 A1 * 10/2024 Baumgartner ......... H01R 13/44
2025/0323430 A1 * 10/2025 Feng ........................ H01R 4/34

FOREIGN PATENT DOCUMENTS

DE 202018100111 U1 9/2018
EP 0951099 A2 10/1999
GB 2270209 A 3/1994

OTHER PUBLICATIONS

Extended European Search Report for Application No. 22175707.3; dated Nov. 3, 2022; 11 pages.

* cited by examiner

*Primary Examiner* — Truc T Nguyen
(74) *Attorney, Agent, or Firm* — Billion & Armitage

(57) ABSTRACT

An electrical connector includes a connector housing configured for mating with a corresponding counter-connector. Further, the electrical connector has an electrical contacting means arranged in the connector housing and configured for electrically contacting with the electrical conductor. The electrical contacting means is further configured for establishing an electrical contact with the counter-connector. Moreover, the electrical connector includes an insulative sleeve attachable to the electrical contacting means. The insulative sleeve is shaped to prevent a finger of a human from touching the electrical contacting means.

17 Claims, 5 Drawing Sheets

ELECTRICAL SAFETY CONNECTOR

CROSS-REFERENCE TO RELATED APPLICATION

This application claims benefit of priority to European Patent Application No. 22175707.3 filed on May 27, 2022, the entire disclosure of which is hereby incorporated by reference.

TECHNICAL FIELD OF THE INVENTION

The present disclosure relates to an electrical connector for connecting an electrical conductor to a counter-connector.

BACKGROUND

In modern vehicles, the transmission of electric power and signals is becoming increasingly important. This particularly applies to electric vehicles, whose functionality is highly based on a stable energy supply from a charging inlet to a battery and from the battery to one or more electric devices, such as electrical engines.

To transmit electric power and signals, wiring harnesses are usually utilized in the automotive industry. A wiring harness, also known as a cable harness, is an assembly of electric conductors such as busbars, cables and/or wires. The wiring harnesses are prefabricated and then mounted into a vehicle and connected to respective electric interfaces. In hybrid and electric vehicles high electric currents and high voltages are often transmitted by means of busbars. The busbars may form part of the wiring harness and/or of the further electric architecture of the vehicle which may be e.g., connected to the wiring harness. Exemplarily, busbars may be directly attached to the battery of the vehicle as an interface for further electric connections. Moreover, a busbar provided in the wiring harness may serve to conduct electric power from a battery of the vehicle to an electric engine of the vehicle and/or from a charging port to the battery.

For electric vehicles, it is crucial that a busbar, which for example is supposed to provide energy from the battery to the vehicle, but also any other electrical conductor provides a sufficient safety standard. Here, the safety of the connection refers not only to the reliability of the connection during use, but also to the safety of handling the connection. Particularly the aspect of safety includes that the connection must be safe to touch so that no danger arises from high voltages and/or currents in a high-voltage system such as an electrified vehicle. Thereby contact safety must be ensured in the connected state and the unconnected state. Exemplarily, in the event of an inspection or in the event of servicing, e.g., battery module connectors need to be safely handled without the need to provide special tools or complicated safety procedures. Accordingly, it is a general objective of the present disclosure to provide an electrical connector that allows for a safe handling.

An existing solution for providing a safe connection between busbars is described in document EP 3 419 119 A1. This document refers to a module connector, for batteries of vehicles with an electric drive. The module connector has two connection parts which can be electrically connected to one another in an electrically conductive manner. Each connection part is provided with a touch protection having an outer, electrically insulated collar and an electrically insulated protection pin which is surrounded by the collar. Particularly, a current bridge which electrically connects two conductor points and which the collar and protection pin project beyond is located at least one connection part between the collar and protection pin. Hence, the user is prevented from touching the current bridge by means of the collar and the protection pin.

EP 3 419 119 A1 suggests that the protection pin is attached to an affixing element that serves to mechanically connect the two connection parts. For this configuration multiple disadvantages have been identified.

First, the protection pin can be damaged and/or fall off the affixing element during connecting the two connection parts, particularly since the affixing element can be exposed to complex motions and/or mechanical loads which may damage and/or remove the protection pin. Exemplarily the insulative material may be damaged and/or retained by a thread of the affixing element. This bears the risk that during inspection or servicing when the connection parts are separated the protection is insufficient and a security risk exists.

Second, the module connector requires specific affixing elements which include the protection pin, i.e., an insulation. Exemplarily a screw without insulative provisions cannot be utilized.

Third, since the protection pin is attached to a tip of an affixing element the length of the connection which is required in mating direction is increased. This is particularly disadvantageous for applications in confined spaces.

Fourth, the module connector of EP 3 419 119 A1 has drawbacks regarding mountabiliy. In particular, the assembly sequence is complicated to perform by a worker.

Thus, it is an object of the present disclosure to provide an electrical connector that overcomes the aforementioned drawbacks at least partially.

SUMMARY

These objects are achieved, at least partly, by an electrical connector according to the present disclosure. Particularly, the object is achieved by an electrical connector for connecting an electrical conductor to a counter-connector, particularly for connecting a busbar of an electrical vehicle to the counter-connector. The electrical conductor may include a busbar and/or a terminal of a busbar.

The electrical connector includes a connector housing configured for mating with a corresponding counter-connector. Thereby a receptacle, such as an opening, configured for at least partially receiving the counter-connector may be formed in the connector housing. The connector housing may include a bent sheet metal and/or a plastic, particularly a reinforced plastic. Moreover, the connector housing may be manufactured by casting or injection molding. Further, it is understood that the connector housing may include a plurality of parts. Exemplarily, the connector housing may include an inner part and a surrounding part which e.g., prevents the penetration of water and/or dust.

Further, the electrical connector includes an electrical contacting means being arranged in the connector housing and configured for electrical contact with the electrical conductor. The electrical contacting means is further configured for establishing an electrical contact with the counter-connector. Exemplarily, the electrical contacting means may be arranged in the above-mentioned receptacle that may be formed in the connector housing. Moreover, the electrical contacting means may be shaped for contacting the electrical conductor by means of a planar contact. Exemplarily, the electrical contacting means may have a substantially hollow cylindrical shape with a through hole in an axial direction of the hollow cylindrical shape. Thereby a first flat surface of the hollow cylindrical shape may be arranged for contacting the electrical conductor, particularly the terminal of the busbar. Further, a second flat surface of the hollow cylindrical shape may be arranged for contacting the electrical contacting means of the counter-connector. The electrical contacting means may include a conductor material. The conductor material may include at least one of the following: copper, aluminum, a copper based alloy and/or an aluminum based alloy. Further, the conductor material may include brass. Further, the electrical contacting means may be attached to the connector housing by means of a form-fit connection and/or a frictional connection.

Moreover, the electrical connector includes an insulative sleeve attachable to the electrical contacting means, wherein the insulative sleeve is shaped to prevent a finger of a human from touching the electrical contacting means. A sleeve according to the present disclosure may be referred to as a tubular part, such as a hollow axle and/or a bushing, configured to fit over another part. It is understood that the insulative sleeve may be shaped to prevent a finger of a human from touching the electrical contacting means by configuring a length, an outer diameter, and/or an inner diameter of the insulative sleeve. Thereby it is understood that the insulative sleeve may need to be shaped in accordance with the connector housing to prevent finger contact. The insulative sleeve may primarily consist of an insulative material. Exemplarily, the insulative material may include a plastic, particularly a reinforced plastic. The insulative sleeve may be injection molded, milled, and/or pressed. Touch-protection against finger contact according to the present disclosure may be defined according to IPxxB as per ISO 20653.

Exemplarily, in an assembled state where the insulative sleeve is attached to the electrical contacting means, the insulative sleeve may limit the accessibility for a human finger of the above-mentioned receptacle that may be formed in the connector housing and in which the electrical contacting means may be arranged. Further exemplarily, in the assembled state, the insulative sleeve may form a gap with the connector housing. This gap may be configured such that a finger of a human cannot reach the electrical contacting means in the connector housing, whereas an electrical counter-contacting means of the counter-connector may contact the electrical contacting means. Particularly, the connector housing may include an outer, electrically insulated collar, wherein in an assembled state the insulative sleeve is surrounded by the electrically insulated collar. Thereby, the electrical contacting means which the collar and the insulative sleeve project beyond in mating direction is located between the collar and insulative sleeve. Hence, contact with the electrical contacting means by a human finger may be avoided. Even further exemplarily, by providing the insulative sleeve it is also possible to protect an element being arranged inside the insulative sleeve against finger contact.

Furthermore, with the insulative sleeve being attachable to the electrical contacting means, in an assembled condition a movement and/or mechanical loading of the insulating sleeve during mating the electrical connector to the counter-connector can be reduced compared to the case when an insulation is provided on an affixing element configured for affixing the electrical connector to the counter-connector. Hence, a risk of damaging and/or removing the insulative sleeve is decreased. Exemplarily, when an insulation is provided on a tip of a screw or on a threaded sleeve for affixing the electrical connector to a counter-connector, the screw or the threaded sleeve are exposed to complex motions and/or mechanical loads which may damage and/or remove the insulation.

The insulative sleeve may include a substantially hollow cylindrical shape, wherein the electrical contacting means may have a through-hole shaped to at least partially receive the insulative sleeve therein. With this configuration an affixing element configured for affixing the electrical connector to the counter-connector may be introduced through the electrical contacting means, wherein the affixing element does not require an insulation. Exemplarily a screw without insulative provisions may be utilized.

The term "substantially" according to the present application may refer to the aspect that not the geometrically strict form is required, but e.g., tolerance-related deviations are also possible.

The electrical contacting means and the insulative sleeve may extend in a mating direction of the electrical connector in an assembled condition, and the insulative sleeve may extend further in the mating direction than the electrical contacting means, preferably by the mating direction length of the electrical contacting means multiplied by at least 0.2, further preferably by at least 0.5, even further preferably by at least 0.7, and most preferably by at least 1.0. By the insulative sleeve extending further in the mating direction than the electrical contacting means a finger contact of the electrical contacting means which is arranged in the connector housing may be avoided. This is as a finger may about the insulative sleeve and the connector housing, e.g., the above-mentioned electrically insulated collar, before contacting the electrical contacting means inside the connector housing. The particularly above-mentioned relative lengths have proven to allow for a sufficient protection.

The insulative sleeve may include a mating end with a hollow opening, wherein the hollow opening has a diameter that protects the inside of the insulative sleeve at least partially against finger contact according to IPxxB as per ISO 20653. The mating end may be defined as the end of the insulative sleeve which is inserted into the counter-connector first during mating. By the insulative sleeve including a mating end with a hollow opening, an affixing element which does not require an insulation, such as a screw, may be arranged inside the insulative sleeve, while finger contact with the affixing element can be avoided. Further, a counter-affixing element of the counter-connector may be introduced into the insulative sleeve for mating with the affixing element.

The insulative sleeve may include fixing means for attaching the insulative sleeve to the electrical contacting means, wherein a through hole may be formed through the insulative sleeve and the electrical contacting means such that an affixing element configured for affixing the electrical connector to the counter-connector is arrangeable at least partially inside the insulative sleeve. When the insulative sleeve is attached to the electrical contacting means, the fixing means may avoid retracting the insulative sleeve from the electrical contacting means. Since the affixing element is arrangeable at least partially inside the insulative sleeve, affixing elements which do not need to be insulated may be utilized. Further, since no insulation needs to be attached to the tip of the affixing element the length of the electrical connector which is required in mating direction may be reduced. Moreover, by the insulative sleeve being attachable to the electrical contacting means, in an assembled condition a movement and/or mechanical loading of the insulating sleeve during mating the electrical connector to the counter-connector can be reduced compared to the case when an insulation is provided on the affixing element configured for affixing the electrical connector to the counter-connector. Hence, a risk of damaging and/or removing the insulative sleeve is decreased. Exemplarily, when an insulation is provided on a tip of a screw or a threaded sleeve for affixing the electrical connector to the counter-connector, the screw or the threaded sleeve are exposed to complex motions and/or mechanical loads which may damage and/or remove the insulation.

The fixing means may include at least one outer latching arm, configured for establishing a snap connection with the electrical contacting means in an assembled condition. The fixing means may include at least one protrusion for establishing a form-fit connection with a respective undercut of the electrical contacting means.

The electrical connector may include an affixing element being configured for affixing the electrical connector to the counter-connector, wherein the affixing element may be arranged at least partially inside the insulative sleeve when assembled. Preferably the insulative sleeve is configured such that the affixing element is protected against finger contact according to IPxxB as per ISO 20653. It is understood that the protection against finger contact according to IPxxB as per ISO 20653 may be achieved by a respective diameter and/or length of the insulative sleeve. Nevertheless, it is further understood that also the affixing element may be configured, e.g., in length and/or diameter such that the affixing element is protected against finger contact according to IPxxB as per ISO 20653. Further, since no insulation needs to be attached to the tip of the affixing element for finger contact protection the length of the electrical connector which is required in mating direction may be reduced. Moreover, by the insulative sleeve being attachable to the electrical contacting means, in an assembled condition a movement and/or mechanical loading of the insulating sleeve during mating the electrical connector to the counter-connector can be reduced compared to the case when an insulation is provided on the affixing element. Hence, a risk of damaging and/or removing the insulative sleeve is decreased. Exemplarily, when an insulation is provided on a tip of a screw or a threaded sleeve for affixing the electrical connector to a counter-connector the screw, or the threaded sleeve are exposed to complex motions and/or mechanical loads which may damage and/or remove the insulation.

The insulative sleeve may be configured such that the affixing element is affixable to a counter-affixing element of the counter-connector inside the insulative sleeve. Hence, both affixing elements may be protected, e.g., against dust and/or humidity, inside the insulative sleeve.

Further, the affixing element may be a screw and the counter-affixing element may be a threaded sleeve. Hence, a sufficient fixation may be achieved that is required for connecting busbars in vehicles.

The connector housing may include a cover which in an open state allows the insertion of an affixing element. Hence, when the cover is closed, a further protection against finger contact with an affixing element being arranged inside the connector housing may be provided. Further, by the cover which in an open state allows the insertion of an affixing element, the mountability may be improved, as the electrical connector allows for being provided in a pre-assembled state where the affixing element may still be introduced.

The insulative sleeve may be attached to the electrical contacting means, and the connector housing may include:

- a first recess configured for inserting the electrical conductor, wherein preferably the electrical contacting means and the insulative sleeve are adjacent to the first recess, and
- a second recess configured for inserting an affixing element being configured for affixing the electrical connector to the counter-connector.

Exemplarily, if the electrical conductor which is to be inserted includes a busbar terminal with a rectangular cross-section, the shape of the first recess may correspond at least partially to that of the busbar terminal with rectangular cross-section. Further exemplarily, if the affixing element which is to be inserted includes a screw, the shape of the second recess may correspond at least partially to that of the screw. Moreover, the first recess and the second recess may have an intersecting portion. Hence, the affixing element, when inserted, may protrude through the electrical conductor when inserted. The configuration described above may allow that the electrical connector does not require a specific affixing element which includes an insulation. Exemplarily, a screw without insulative provisions can be utilized. Further, since no insulation needs to be attached to the tip of the affixing element the length of the connection which is required in mating direction may be decreased. This is particularly advantageous for applications in confined spaces. Moreover, mountability may be improved. This is as the electrical connector allows for being provided in a pre-assembled state where only the electrical conductor, e.g., the busbar terminal, and the affixing element need to be inserted and fixed to the connector housing.

Further, the first recess and the second recess may be configured such that an insertion direction for the affixing element is substantially perpendicular to an insertion direction for the electrical conductor. Hence, manufacturing of the electrical conductor may be improved, as the affixing element may be inserted into a through hole of the electrical conductor, wherein the through hole is perpendicular to the insertion direction of the electrical conductor.

The insulative sleeve may include at least one inner latching arm, configured for establishing a snap connection with the affixing element in an assembled condition. Particularly, the at least one inner latching arm may include at least one protrusion for establishing a form-fit connection with a respective recess of the affixing element. Hence, the insulative sleeve may retain the affixing element to the electrical connector. Further, the at least one inner latching arm may allow for a positioning of the affixing element relative to the electrical connector. Moreover, the affixing element may include at least two recesses which allow for the affixing element to be arranged in two different positions relative to the electrical connector.

The insulative sleeve may include at least one stopper protrusion, wherein the stopper protrusion abuts the electrical contacting means in an assembled condition. The at least one stopper protrusion is preferably arranged at an outer circumference of the insulative sleeve. The at least one stopper protrusion may avoid a further insertion of the insulative sleeve into the electrical contacting means against the mating direction. Hence, the above-mentioned fixing means together with the at least one stopper protrusion may allow for an improved fixation of the insulative sleeve to the electrical contacting means.

The electrical connection means may include a bushing, wherein in an assembled condition the insulative sleeve may be arranged at least partially in the bushing. Hence, the inside of the bushing may be insulated against an affixing element being arranged inside the insulative sleeve.

BRIEF DESCRIPTION OF THE DRAWINGS

The present invention is now described, by way of example with reference to the accompanying drawings, in which.

DETAILED DESCRIPTION

Figure 7:
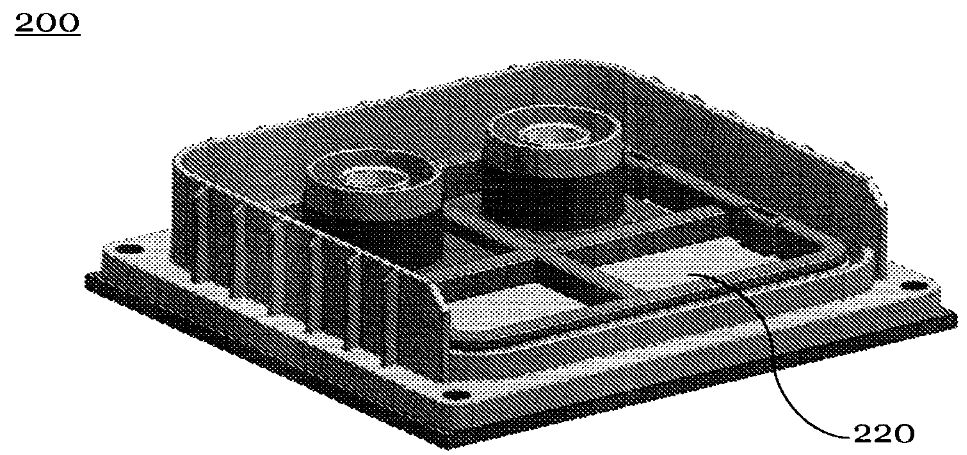
FIG. 7 is a perspective view of a second electrical connector according to the present disclosure according to some embodiments.
Figure 8:
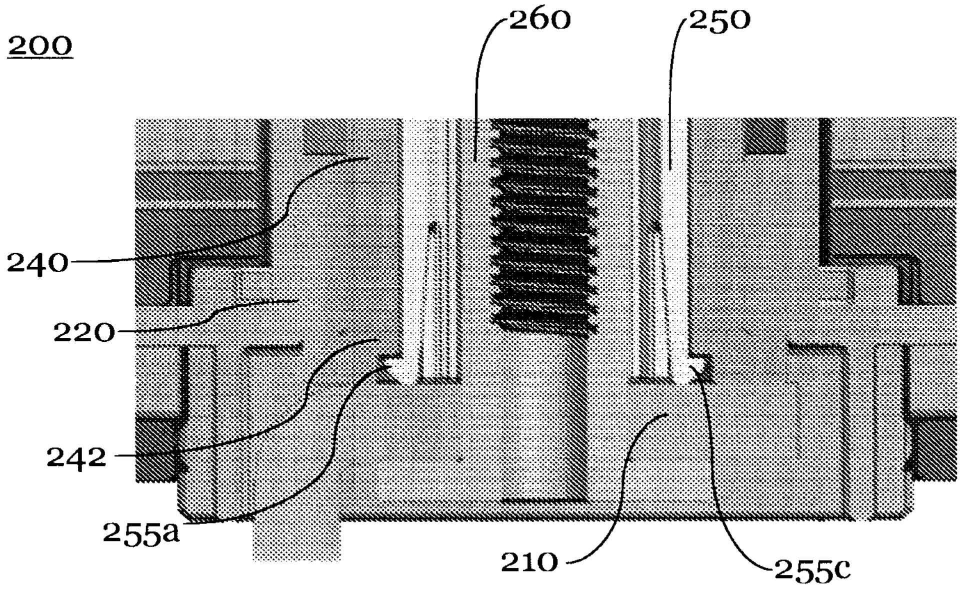
FIG. 8 is a detailed section view of the second connector according to some embodiments.

FIGS. 1 to 5 depict a first electrical connector 100 according to the present disclosure and FIGS. 7 to 9 depict a second electrical connector 200 according to the present disclosure, wherein it is understood that the first electrical connector 100 may be connected to the second electrical connector 200. Hence, the second electrical connector 200 may also be referred to as counter-connector 200. The second electrical connector 200 is partially configured as the first electrical connector 100. This will be understood from the use of equivalent reference signs, wherein only the first digit, i.e., "1" and "2", deviates between the first electrical connector 100 and the second electrical connector 200. Accordingly, the description for the second electrical connector 200 is not repeated.

Figure 1:
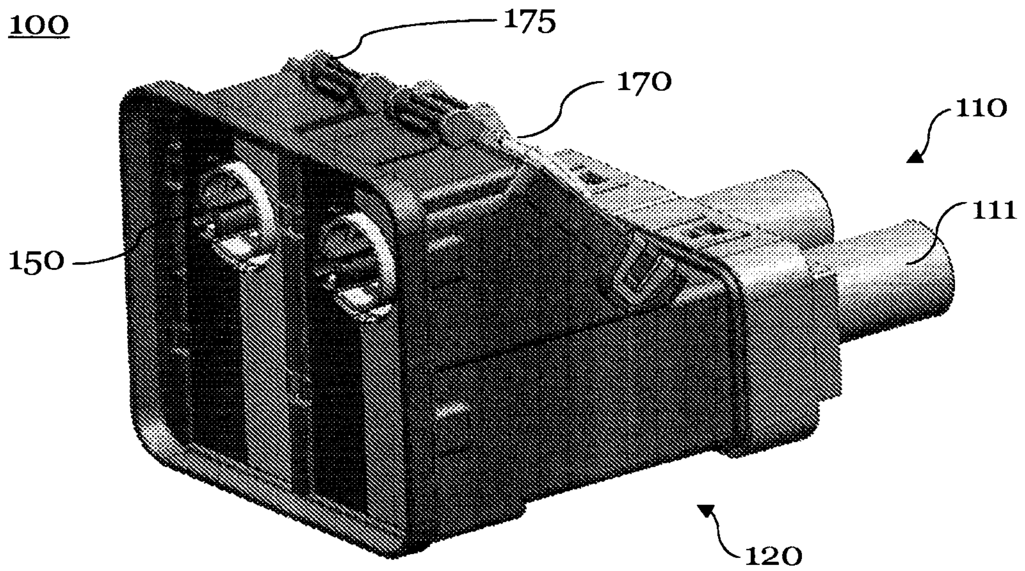
FIG. 1 is a perspective view of a first electrical connector according to some embodiments.

As is understood from FIG. 1 with FIG. 7, the first electrical connector 100 serves for connecting an electrical conductor 110 to the counter-connector 200, particularly to an electrical conductor 210 of the counter-connector 200. In the first electrical connector 100 the electrical conductor 110 includes a cylindrical insulated busbar 111 and a busbar terminal 112 with a through hole, as can be e.g., seen in FIG. 4.

Figure 2:
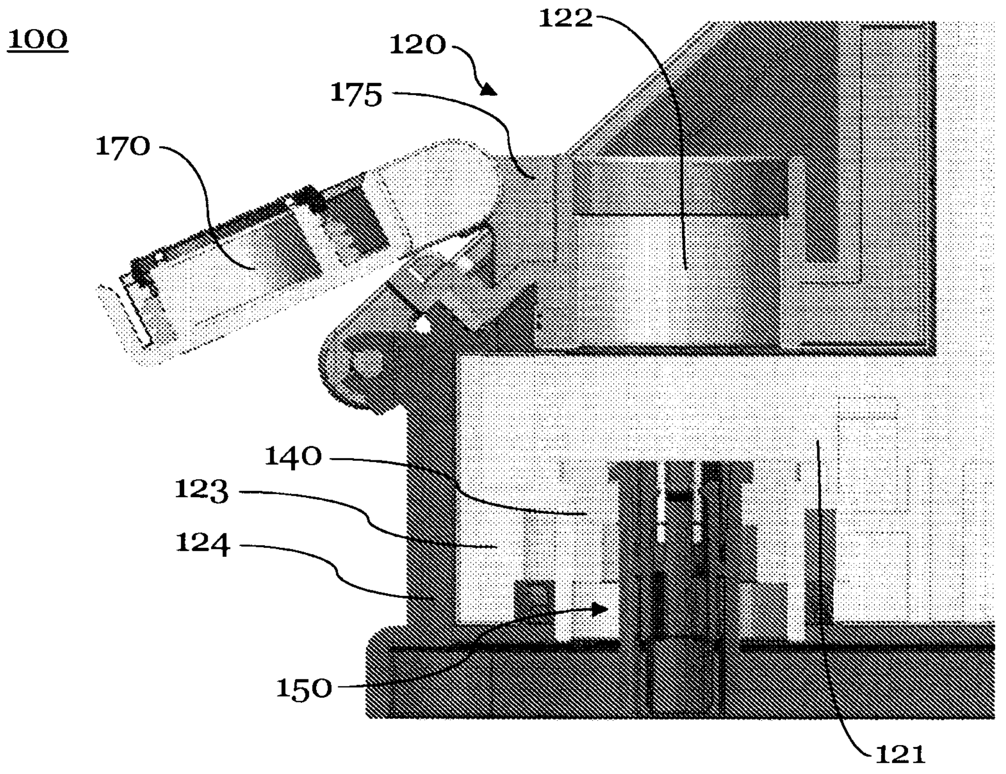
FIG. 2 is a detailed section view of the first electrical connector with the insulative sleeve being attached according to some embodiments.

As exemplarily shown in FIGS. 1 and 2, the electrical connector 100 includes a connector housing 120 configured for mating with a corresponding counter-connector 200. Thereby the connector housing 120 includes an inner part 123 and an outer part 124 which surrounds the inner part 123 and exemplarily prevents the penetration of water and/or dust.

Figure 3:
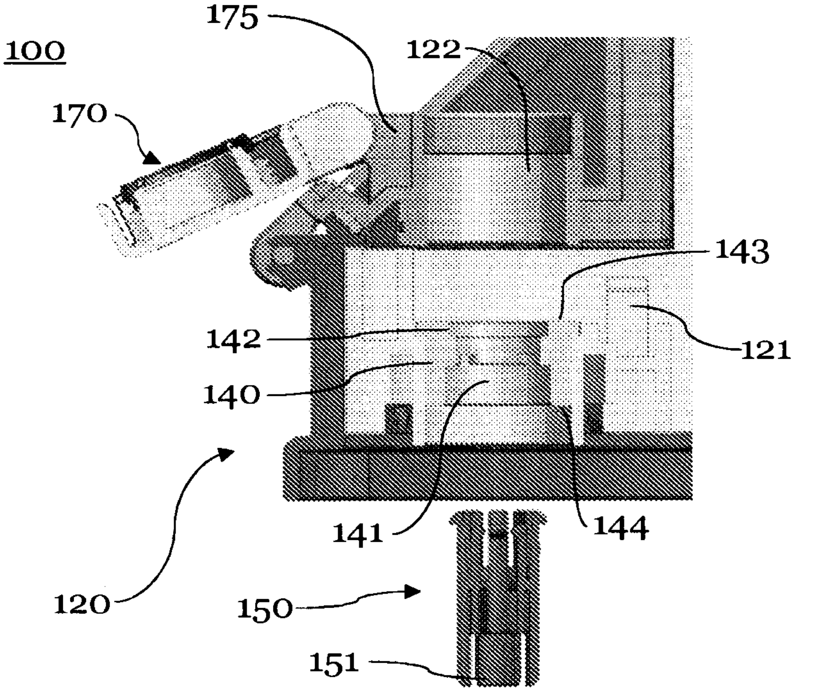
FIG. 3 is a detailed section view of the first electrical connector according to some embodiments.
Figure 4:
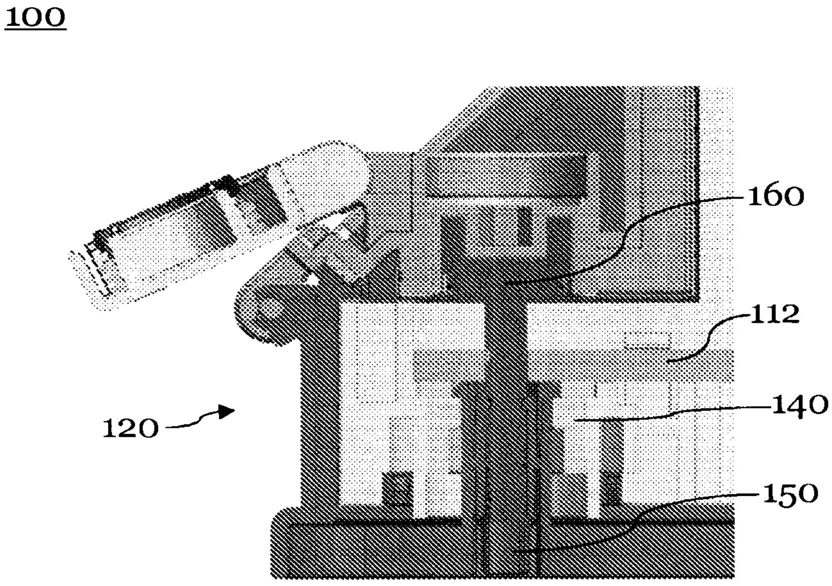
FIG. 4 is a detailed section view of the first electrical connector in an assembled condition according to some embodiments.

Further, as depicted in FIGS. 2 to 5, the electrical connector 100 includes an electrical contacting means 140 being arranged in the connector housing 120 and configured for electrically contacting with the electrical conductor 110, namely the busbar terminal 112. The electrical contacting means 140 is further configured for establishing an electrical contact with the counter-connector 200. Particularly, the electrical contacting means 140 is a bushing and has a substantially hollow cylindrical shape with a through hole in an axial direction of the hollow cylindrical shape. In the following, the term "contacting means" and "bushing" are used synonymously for element 140. Thereby a first flat surface 143 of the hollow cylindrical shape is arranged for contacting the electrical conductor 110 and particularly the busbar terminal 112 (as shown in FIG. 4). Further, a second flat surface 144 of the hollow cylindrical shape is arranged for contacting the electrical contacting means 240 of the counter-connector 200.

Further, as depicted in FIGS. 2 to 5, the electrical connector 100 includes an insulative sleeve 150 being attachable to the electrical contacting means 140. Thereby in FIGS. 2, 4, 5A, and 5B the insulative sleeve 150 is attached to the electrical contacting means 140.

Figure 5A:
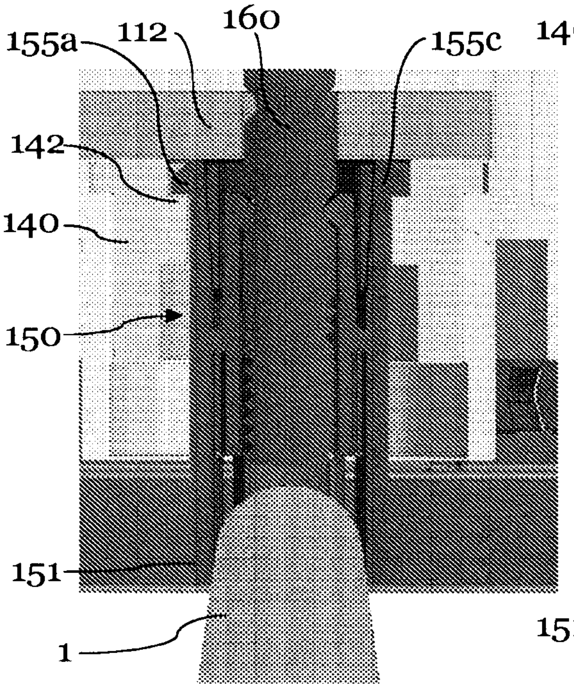
FIG. 5A is a detailed section view of the first electrical connector during a finger insertion test according to some embodiments.
Figure 5B:
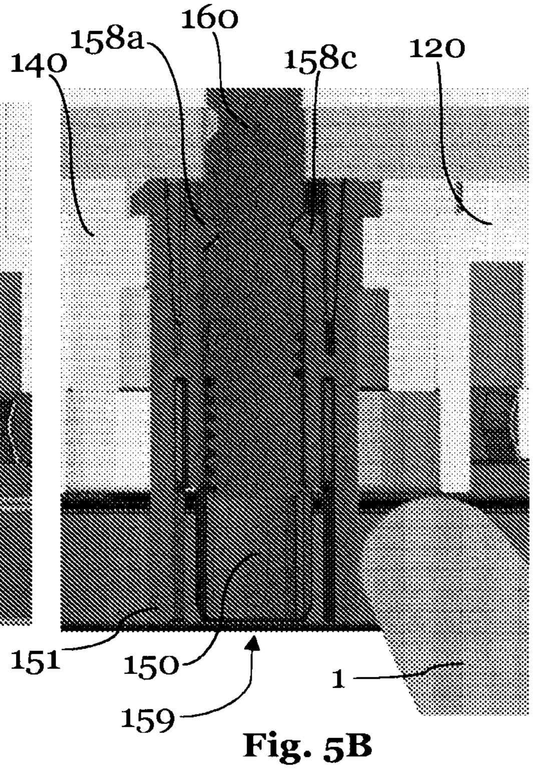
FIG. 5B is a detailed section view of the first electrical connector during a finger insertion test according to some embodiments.

As can be seen in FIG. 5B, the insulative sleeve 150 is shaped, i.e., has the length and the diameter, to prevent a finger 1 of a human from touching the electrical contacting means 140. Particularly, FIG. 5B illustrates that a test finger 1 according to IPxxB as per ISO 20653 fails to reach the electrical contacting means 140. This is as the finger 1 abuts the insulative sleeve 150 and the connector housing 120 before contacting the electrical contacting means 140 being recessed inside the connector housing 120.

Further, according to FIGS. 2, 4, and 5, the insulative sleeve 150 is arranged in the bushing 140. Particularly, the insulative sleeve 150 extends through the bushing 140 along the whole axial length of the bushing 140.

Moreover, as depicted in FIGS. 1 to 6, the insulative sleeve 150 includes a substantially hollow cylindrical shape and the electrical contacting means 140 has a through hole 141 shaped to at least partially receive the insulative sleeve therein 150.

As illustrated in FIGS. 2, 4, 5A, and 5B, in an assembled condition, the electrical contacting means 140, i.e., the bushing, and the insulative sleeve 150 extend in a mating direction of the electrical connector 100. Thereby the insulative sleeve 150 extends further in the mating direction than the electrical contacting means 140. Particularly, the insulative sleeve 150 extends further in the mating direction than the electrical contacting means 140 by the mating direction length of the electrical contacting means 140 multiplied by at least 1.0.

As depicted in FIGS. 5A and 5B, the insulative sleeve 150 includes a mating end 151 with a hollow opening 159. The hollow opening 159 has a diameter that protects the inside of the insulative sleeve 150 at least partially against finger contact according to IPxxB as per ISO 20653.

Figure 6A:
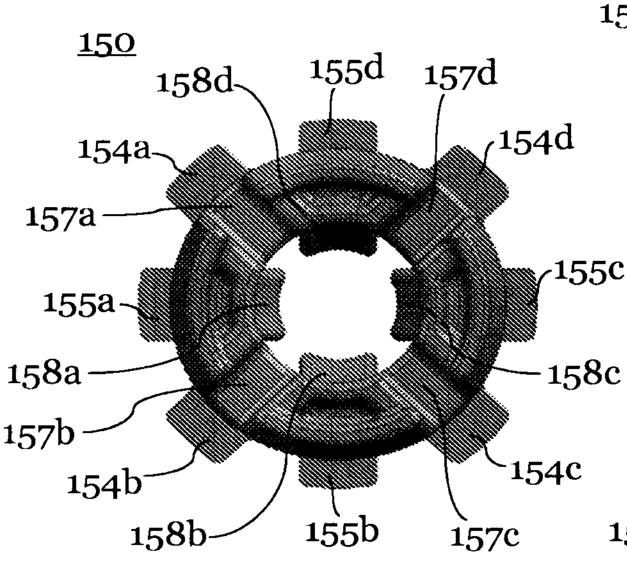
FIG. 6A is a top view of an insulative sleeve for the first electrical connector according to some embodiments.
Figure 6B:
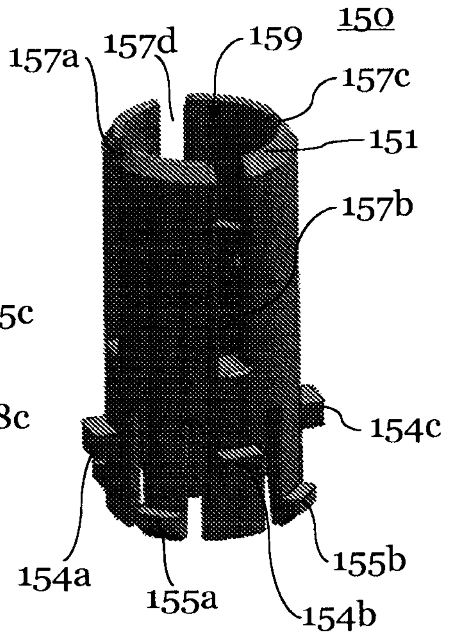
FIG. 6B is a perspective view of an insulative sleeve for the first electrical connector.

Further, FIGS. 5A, 6A, and 6B depict that the insulative sleeve 150 includes fixing means 155*a*, 155*b*, 155*c*, 155*d* for attaching the insulative sleeve 150 to the electrical contacting means 140, wherein the fixing means 155*a*, 155*b*, 155*c*,

155*d* are provided in form of four outer latching arms 155*a*, 155*b*, 155*c*, 155*d*, configured for establishing a snap connection with an undercut 142 of the electrical contacting means 140 in an assembled condition. Further, a through hole is formed through the insulative sleeve 150 and the electrical contacting means 140 such that an affixing element 160 (here in the form of a screw) configured for affixing the electrical connector 100 to the counter-connector 200 is arrangeable at least partially inside the insulative sleeve 150 and the electrical contacting means 140.

As depicted in FIGS. 4, 5A, and 5B the electrical connector 100 includes an affixing element 160 being configured for affixing the electrical connector 100 to the counter-connector 200. The affixing element 160 is arranged partially inside the insulative sleeve 150. In this example, the affixing element 160 is a screw and the counter-affixing element 260, as e.g., depicted in FIG. 8 is a threaded sleeve.

Further, as depicted in FIG. 5A, the insulative sleeve 150 is configured in length and diameter such that the affixing element 160 is protected against finger contact according to IPxxB as per ISO 20653. Particularly, FIG. 5A illustrates that a test finger 1 according to IPxxB as per ISO 20653 fails to reach the affixing element 160 being arranged partially inside the insulative sleeve 150.

Moreover, exemplarily from FIGS. 5A and 5B it is understood that the insulative sleeve 150 is configured such that the affixing element 160 is affixable to a counter-affixing element 260 of the counter-connector 200 inside the insulative sleeve 150. Particularly, the insulative sleeve 150 has four mating slots 157*a*, 157*b*, 157*c*, 157*d* extending in an axial direction of the insulative sleeve and which allow for the insulative sleeve 150 to engage with inside ribs of the insulative sleeve 250 of the counter-connector 200, as depicted in FIGS. 9A, 9B, 10A, and 10B. Hence, the affixing element 160 and the counter-affixing element 260 may get in contact inside the insulative sleeve 150.

Figure 9A:
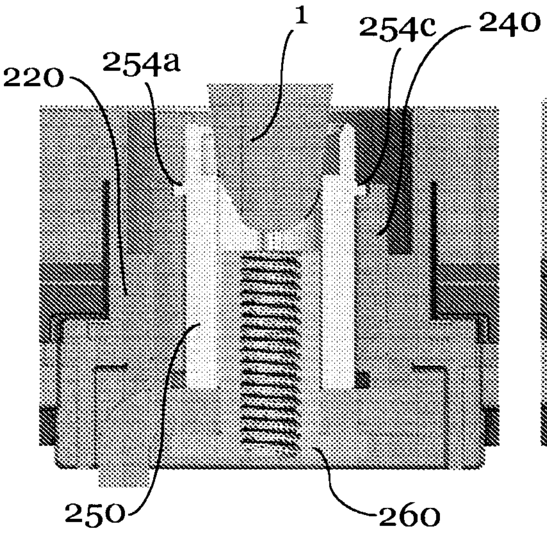
FIG. 9A is a detailed section view of the second connector during a finger insertion test according to some embodiments.
Figure 9B:
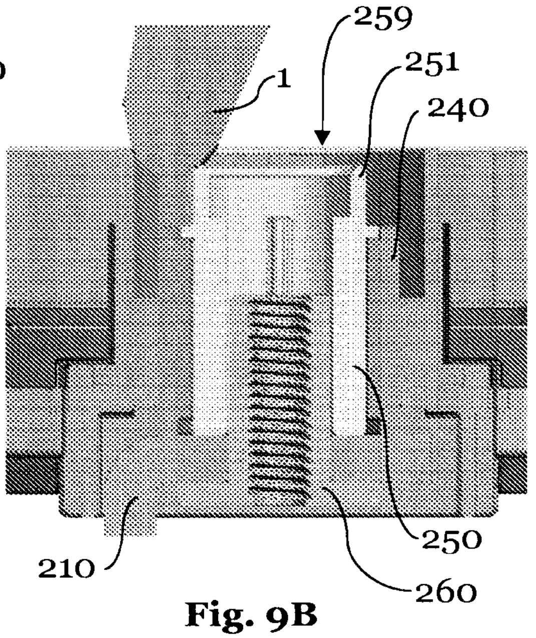
FIG. 9B is a detailed section view of the second connector during a finger insertion test according to some embodiments.
Figure 10A:
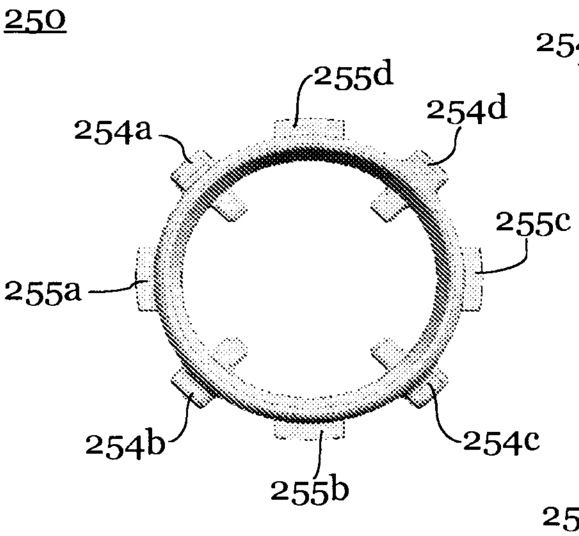
FIG. 10A is a top view of an insulative sleeve for the second electrical connector according to some embodiments.
Figure 10B:
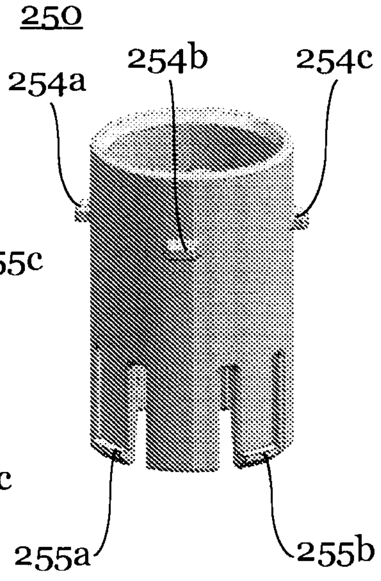
FIG. 10B is a perspective view of an insulative sleeve for the second electrical connector according to some embodiments.

It is understood that the insulative sleeve 250 of the counter-connector 200 is rotated by 45° around its axis in the view of FIG. 8 compared to the perspective shown in FIGS. 9A and 9B. Hence, in FIG. 8 the inside ribs of the insulative sleeve 250 of the counter-affixing element 260 are not depicted in cut-view and in FIGS. 9A and 9B the outer latching arms 255*a* are not visible.

As illustrated in FIGS. 1, 2 and 3, the connector housing 120 includes a cover 170 which in an open state allows the insertion and manipulation of an affixing element 160. Moreover, the connector housing 120 includes a further larger cover 175 which in an open state allows the mounting of the electrical contacting means 140 and/or the inner part 123 of the connector housing 120.

As shown in FIGS. 2, 4, 5A, and 5B, the insulative sleeve 150 is attached to the electrical contacting means 140. Moreover, as will be understood from FIG. 3 with FIG. 4, the connector housing 120 includes a first recess 121 configured for inserting the busbar terminal 112, wherein the electrical contacting means 140 and the insulative sleeve 150 are adjacent to the first recess 121. Further, as will be also understood from FIG. 3 with FIG. 4, the connector housing 120 includes a second recess 122 configured for inserting the screw/affixing element 160 being configured for affixing the electrical connector 100 to the counter-connector 200. Thereby, the first recess 121 and the second recess 122 are configured such that an insertion direction for the affixing element 160 is perpendicular to an insertion direction for the electrical conductor 110.

As depicted in FIGS. 5B and 6A, the insulative sleeve 150 includes four inner latching arms 158*a*, 158*b*, 158*c*, 158*d*, configured for establishing a snap connection with the affixing element 160 in an assembled condition. In FIG. 5B the snap connection with the affixing element 160 is established, wherein a protrusion on each of the four inner latching arms 158*a*, 158*b*, 158*c*, 158*d* is engaged with a respective recess on the affixing element 160.

Further, in FIGS. 4, 5A and 5B it is illustrated that the affixing element 160 includes two angular recesses spaced apart in an axial direction of the affixing element 160 and which allow for the affixing element 160 to be positioned in two different positions relative to the electrical connector by means of the inner latching arms 158*a*, 158*b*, 158*c*, 158*d*. Thus, the affixing element 160 may be axially displaced, e.g., for being screwed into the counter-affixing element 260.

The insulative sleeve 150, as depicted in FIGS. 6A and 6B, includes four stopper protrusions 154*a*, 154*b*, 154*c*, 154*d*, wherein the four stopper protrusions abut the electrical contacting means 140 in an assembled condition. Further, the four stopper protrusions are arranged at an outer circumference of the insulative sleeve 150.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes", "including", "includes", and/or "including," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

The invention claimed is:

1. An electrical connector, comprising:
- a connector housing configured to mate with a corresponding counter-connector;
- an electrical contacting means arranged in the connector housing and configured to electrically contact the electrical conductor, wherein the electrical contacting means is further configured to establish electrical contact with the counter-connector, and
- an insulative sleeve attachable to the electrical contacting means, wherein the insulative sleeve is shaped to prevent a finger of a human from touching the electrical contacting means, wherein the insulative sleeve comprises a substantially hollow cylindrical shape and wherein the electrical contacting means has a through hole shaped to at least partially receive the insulative sleeve therein.

2. The electrical connector according to claim 1, wherein the electrical contacting means and the insulative sleeve extend in a mating direction of the electrical connector in an assembled condition and wherein the insulative sleeve extends further in the mating direction than the electrical contacting means.

3. The electrical connector according to claim 1, wherein the insulative sleeve comprises a mating end with a hollow opening and wherein the hollow opening has a diameter that at least partially protects the inside of the insulative sleeve against finger contact.

4. The electrical connector according to claim 1, wherein the insulative sleeve comprises fixing means for attaching the insulative sleeve to the electrical contacting means and wherein a through hole is formed through the insulative sleeve and the electrical contacting means such that an affixing element configured to affix the electrical connector to the counter-connector is arrangeable at least partially inside the insulative sleeve.

5. The electrical connector according to claim 4, wherein the fixing means comprises at least one outer latching arm configured to establish a snap connection with the electrical contacting means in an assembled condition.

6. The electrical connector according to claim 4, wherein the insulative sleeve is configured such that the affixing element is affixable to a counter-affixing element of the counter-connector inside the insulative sleeve.

7. The electrical connector according to claim 6, wherein the affixing element is a screw, and the counter-affixing element is a threaded sleeve.

8. The electrical connector according to claim 1, wherein the electrical connector comprises an affixing element configured to affix the electrical connector to the counter-connector and wherein the affixing element is arranged at least partially inside the insulative sleeve when assembled.

9. The electrical connector according to claim 8, wherein the insulative sleeve is configured such that the affixing element is protected against finger contact.

10. The electrical connector according to claim 1, wherein the connector housing comprises a cover that allows insertion of an affixing element when the cover is in an open state.

11. An electrical connector, comprising:
- a connector housing configured to mate with a corresponding counter-connector;
- an electrical contacting means arranged in the connector housing and configured to electrically contact the electrical conductor, wherein the electrical contacting means is further configured to establish electrical contact with the counter-connector, and
- an insulative sleeve attachable to the electrical contacting means, wherein the insulative sleeve is shaped to prevent a finger of a human from touching the electrical contacting means, wherein the insulative sleeve is attached to the electrical contacting means and wherein the connector housing comprises:
- a first recess configured for inserting the electrical conductor; and
- a second recess configured for inserting an affixing element being configured for affixing the electrical connector to the counter-connector.

12. The electrical connector according to claim 11, wherein the electrical contacting means and the insulative sleeve are arranged adjacent to the first recess.

13. The electrical connector according to claim 11, wherein the first recess and the second recess are configured such that an insertion direction for the affixing element is substantially perpendicular to an insertion direction for the electrical conductor.

14. The electrical connector according to claim 4, wherein the insulative sleeve comprises at least one inner latching arm configured to establish a snap connection with the affixing element in an assembled condition.

15. The electrical connector according to claim 1, wherein the insulative sleeve comprises at least one stopper protrusion and wherein the at least one stopper protrusion abuts the electrical contacting means in an assembled condition.

16. The electrical connector according to claim 15, wherein the at least one stopper protrusion is arranged at an outer circumference of the insulative sleeve.

17. An electrical connector, comprising:
- a connector housing configured to mate with a corresponding counter-connector;
- an electrical contacting means arranged in the connector housing and configured to electrically contact the electrical conductor, wherein the electrical contacting means is further configured to establish electrical contact with the counter-connector, and
- an insulative sleeve attachable to the electrical contacting means, wherein the insulative sleeve is shaped to prevent a finger of a human from touching the electrical contacting means, wherein the electrical connector comprises a bushing and wherein, in an assembled condition, the insulative sleeve is arranged at least partially in the bushing.

* * * * *